United States Patent [19]

McFadden et al.

[11] Patent Number: 5,285,719
[45] Date of Patent: Feb. 15, 1994

[54] RAPID FROZEN FOOD THAWING SYSTEM

[75] Inventors: David H. McFadden, Lexington; Ricahrd N. Caron, Dorchester, both of Mass.

[73] Assignee: Gas Research Institute, Chicago, Ill.

[21] Appl. No.: 943,714

[22] Filed: Sep. 11, 1992

[51] Int. Cl.⁵ .......................... A21B 1/00; A21B 1/08; A23L 3/16; A23L 3/16; F24C 15/32
[52] U.S. Cl. ........................................ 99/476; 99/483; 126/21 A; 219/400
[58] Field of Search ................ 99/331, 332, 352, 426, 99/427, 447, 450, 471, 476, 481, 483; 126/21 A; 62/382, 441; 312/236

[56] References Cited

U.S. PATENT DOCUMENTS

| | | |
|---|---|---|
| 3,408,920 | 11/1968 | Smith, Jr. . |
| 3,943,842 | 3/1976 | Bills et al. ................ 99/476 X |
| 4,065,857 | 1/1978 | Nelson et al. ............ 99/483 X |
| 4,071,739 | 1/1978 | Jenn et al. ............... 99/447 X |
| 4,132,216 | 1/1979 | Guibert ................ 126/21 A X |
| 4,155,294 | 5/1979 | Langhammer et al. ....... 99/427 |
| 4,228,730 | 10/1980 | Schindler et al. . |
| 4,295,419 | 10/1981 | Langhammer ........... 99/450 X |
| 4,385,075 | 5/1983 | Brooks . |
| 4,516,012 | 5/1985 | Smith et al. .............. 219/400 |
| 4,627,409 | 12/1986 | Kagomoto ............... 126/21 A |
| 4,674,402 | 6/1987 | Raufeisen . |
| 4,750,416 | 6/1988 | Graham . |
| 4,763.572 | 8/1988 | Kuehl . |
| 4,771,163 | 9/1988 | Thiboutot ................ 219/400 |
| 4,803,961 | 2/1989 | Hiraoka et al. . |
| 4,870,254 | 9/1989 | Arabori et al. ........... 219/400 |
| 4,874,914 | 10/1989 | Eke . |
| 5,142,125 | 8/1992 | Fioroli et al. ........... 126/21 A |

FOREIGN PATENT DOCUMENTS

| | | | |
|---|---|---|---|
| 0245617 | 11/1987 | European Pat. Off. ......... 126/21 A |
| 0085641 | 7/1981 | Japan ................ 126/21 A |
| 0104030 | 6/1982 | Japan ................ 219/400 |

Primary Examiner—Timothy F. Simone
Attorney, Agent, or Firm—Schiller & Kusmer

[57] ABSTRACT

A two-compartment, automated apparatus and a semi-batch process for achieving rapid and complete thawing of a frozen food product, such as french fry potatoes, prior to cooking are disclosed. This invention results in a rapid, economical thawing of frozen food that is especially compatible with automated, commercial-scale deep frying operations.

16 Claims, 4 Drawing Sheets

RAPID FROZEN FOOD THAWING SYSTEM

The present invention relates generally to systems for rapidly thawing frozen food products, and more particularly to a slacking oven for automatically thawing food product in a manner compatible with current automated food processing equipment.

BACKGROUND OF THE INVENTION

Continued growth of so-called "fast food"-style restaurants has increased interest in automating, to the greatest extent possible, the handling and cooking of food so that labor costs and customer waiting time can be reduced. One system for automating the cooking of pre-cut or discrete frozen food products, such as french fried potatoes, is described in U.S. patent application Ser. No. 07/759,606 filed Sep. 13, 1991, now U.S. Pat. No. 5,142,768 which is a continuation of U.S. patent application Ser. No. 07/458,982 filed Dec. 29, 1989 and now abandoned, both applications (hereinafter the "Prior Applications") having been assigned to the present assignee and are incorporated herein by reference. As a part of the automation process attention must be given to preserving the food product in a frozen state until just prior to cooking, when the product should be quickly thawed. On the one hand, modern commercial-scale frying operations work best and most efficiently when there is an ample and continuous supply of fully-thawed food product awaiting cooking. On the other hand, waste and the dangers of contamination and spoilage are reduced by not thawing a batch of frozen food product until immediately prior to cooking.

In the past, these inherently conflicting objectives were often compromised by simply transferring the food product directly from freezer to a "slacking rack", where the food product is disposed in a fry basket, and the latter placed on a rack. The food product is allowed to thaw under ambient conditions, usually near the frypots where the food is to be cooked. Once thawed the basket can be removed from the rack and placed in a frypot. This process relies on human intervention, and thus the appropriate thaw time must be watched; and once the food has thawed, if the operator is not distracted, the basket with the thawed product is removed and placed in a frypot. If the fry products are not completely thawed, at least portions of the product are too cold; while waiting too long to put the basket into the hot oil may result in at least portions of the product being too warm (and in some cases, the food product may become contaminated or spoil). Both circumstances obviously negatively impact the maximum throughput of the frying system since the frying process is dependent in part on the amount of product and the original temperature of the product. Thus, using a slacking or thawing rack to thaw frozen food product before frying it can cause uneven cooking and inferior taste and texture of the final cooked product.

It is therefore desirable to design an automatic thawing system, which is easily used with automated frying systems, such as the one described and claimed in the Prior Applications. The automated thawing system should provide the same degree of thaw as provided by standard slacking racks in at least the same amount of time, but consistently provide the entire thawed product at substantially the same temperature at which maximum throughput of the frying system is maintained. To be truly compatible with modern automated frying systems, an automated thawing system must be capable of thawing 1 to 2 lbs. of food product, such as french fried potatoes, every 20 to 30 seconds without adversely impacting the maximum throughput of common frypots, such as the model MJH-50 manufactured by Frymaster of Shreveport, La. The food product input to the thawing unit would typically be 1 to 2 lbs. of frozen food product at −10 to 0° F. The food product must be rapidly thawed to conditions just above the frozen state, i.e. the thawed product must not be rigid and should have a surface temperature of about 40° F.

In general, the prior art shows a variety of methods and apparatuses for warming, thawing or drying different types of food products. Several prior art patents show the general concept of using warmed air flows for accelerating the thawing or drying process. Several prior art patents also suggest the benefits of a multi-stage approach to the thawing or drying process.

For example, U.S. Pat. No. 4,228,730 (Schindler et al.) teaches an automated apparatus for continuous cooking of frozen french fried potatoes. In Schindler et al., frozen fries are held in a storage hopper (FIG. 3, reference numeral 120) from which they are fed by an upwardly slanting, endless conveyor into an enclosed bath of hot cooking liquid. Thus, a mechanical feed brings frozen fries directly to the cooking oil with little or no thawing. At col. 10, lines 50-53, Schindler et al. specifically state that "frozen pieces of potato are dropped into a hot cooking liquid...", thereby negating any inference that substantial pre-cook thawing might occur in this process.

U.S. Pat. No. 4,385,075 (Brooks) is directed to an apparatus for and method of thawing frozen foods. Brooks teaches the use of a special thawing compartment in combination with a conventional refrigerator appliance having both cooling and freezer sections. In Brooks an electric fan circulates air through the thawing compartment to facilitate thawing of food removed from the freezer section. The air is at a temperature of between 33° F. and 55° F., the ambient conditions of the cooling section of the refrigerator. The advantage of Brooks over similar prior art devices is that it avoids food spoilage after thawing and "uniformly thaws the food load without heating of the food load before complete thawing is achieved..." (col. 2, 11. 17-18). Brooks clearly does not envision use of an above ambient temperature air stream for thawing. This patent does not achieve "rapid" thawing and does not utilize a multi-stage approach.

U.S. Pat. No. 4,674,402 (Raufeisen) teaches a rather complex bakery apparatus designed to: (1) thaw frozen bakery goods using heated air; (2) cool the bakery goods to retard curing; and, (3) heat and humidify the bakery goods for proofing, all in a single system thereby eliminating the need to move the bakery goods between multiple processing units. The frozen bakery goods are placed on a stationary tray rack or tray cart (FIG. 4, reference numeral 29) positioned inside the apparatus. The thawing means of this invention comprises one or two thermostatically-controlled thawing heaters, "preferably of the electrical resistance-type" (col. 3, 1. 41).

U.S. Pat. No. 4,763,572 (Kuehl) is directed to a multi-stage apparatus for reducing the moisture content of liquid honey. The honey enters the apparatus at an upper inlet port and moves by gravity flow across a series of zig-zagged sloping trays while a fan circulates warm air to absorb moisture from the honey. There is no suggestion of using such an apparatus for thawing frozen foods.

U.S. Pat. No. 3,408,920 (Smith) is directed to a two-stage apparatus for rapid roasting of coffee beans. Speed of operation and "rapid turnover of the beans," (col. 1, 11. 65–69) are explicitly described as an objective of this invention. In the Smith apparatus, unroasted or green beans are loaded by gravity feed from a hopper (FIG. 1, reference numeral 14) into a first, upper cylindrical shell where they are fluidized in a counter-current flow of heated roasting gases. When roasting is completed, "the roasted beans... flow by gravity..." into a second, lower cylindrical shell for the cooling step (col. 7, 11. 3–14). In the lower shell, the roasted beans are sprayed from above with a cooling fluid, while also being subjected to fluid flow from below. Thus, this patent teaches a sequential heating and cooling process, not a two-stage thawing process.

U.S. Pat. No. 4,750,416 (Graham) is directed to an apparatus for air-treating food products in conjunction with a spiral conveyor The objective of the air treatment may be "drying, heating, cooking, cooling and freezing..." (col. 1, 11. 16–17). U.S. Pat. No. 4,874,914 (Eke) is directed to a microwave oven that defrosts a frozen food item in multiple stages involving a forced air flow through the oven cavity. Finally, U.S. Pat. No. 4,803,961 (Hiraoka et al.) is directed to an air suction device for a multicylinder engine.

Thus, none of the apparatuses or methods described in the above cited patents is specifically adapted, or even suitable, for the type of rapid, efficient, and continuous or semi-continuous operation required to be effectively compatible with modern, automated, commercial-scale deep frying operations. These and other problems with and limitations of the prior art are overcome with the rapid frozen food thawing system of this invention.

OBJECTS OF THE INVENTION

Accordingly, it is a principal object of the present invention to provide a rapid, efficient thawing system for frozen food products, such as french fried potatoes.

A more specific object of the present invention to provide a slacking system that is readily compatible with modern, automated, commercial-scale deep frying operations.

It is another object of the present invention to provide the same degree of thaw that is obtained by conventional slacking racks and yet will cause efficient slacking of frozen food product without significantly impacting the maximum throughput of commercial frypots.

And another object of the present invention is to provide a multi-stage, semi-batch thawing process of treating a frozen food product utilizing an automated, multicompartment apparatus.

Specifically, it is an object of the present invention to provide a two-compartment slacking oven for two stage processing that utilizes an efficient, low-maintenance gravity feed for a frozen food product and a hot air flow to achieve rapid thawing.

Still a further object of the present invention is to provide a two-compartment slacking oven in which hot air flow is induced through the two compartments in opposite directions to facilitate even and complete thawing of a frozen food product in a relatively short time period.

Other objects of the present invention will in part be obvious and will in part appear hereinafter. The invention accordingly comprises the processes involving the several steps and the relation and order of one or more of such steps with respect to each of the others, and the apparatus possessing the construction, combination of elements, and arrangement of parts exemplified in the following detailed disclosure, and the scope of the application of which will be indicated in the claims.

SUMMARY OF THE INVENTION

The rapid thawing system of the present invention, for carrying out the steps of the process of the present invention, comprises a two-compartment automated slacking oven and a semi-batch process of achieving rapid, even and thorough thawing of a frozen food product, such as french fried potatoes, prior to cooking. The system has the advantages of permitting a continuous, semi-batch operation to increase throughput, employing an economical and maintenance free gravity feed, establishing an airflow through the two compartments in opposite directions to facilitate even thawing, and achieving partial recycling of hot air for additional economies. The system is especially compatible with automated, commercial-scale deep frying apparatus and methods.

BRIEF DESCRIPTION OF THE DRAWINGS

For a fuller understanding of the nature and objects of the present invention, reference should be made to the following detailed description taken in connection with the accompanying drawings wherein.

DETAILED DESCRIPTION OF THE DRAWINGS

Figure 1:
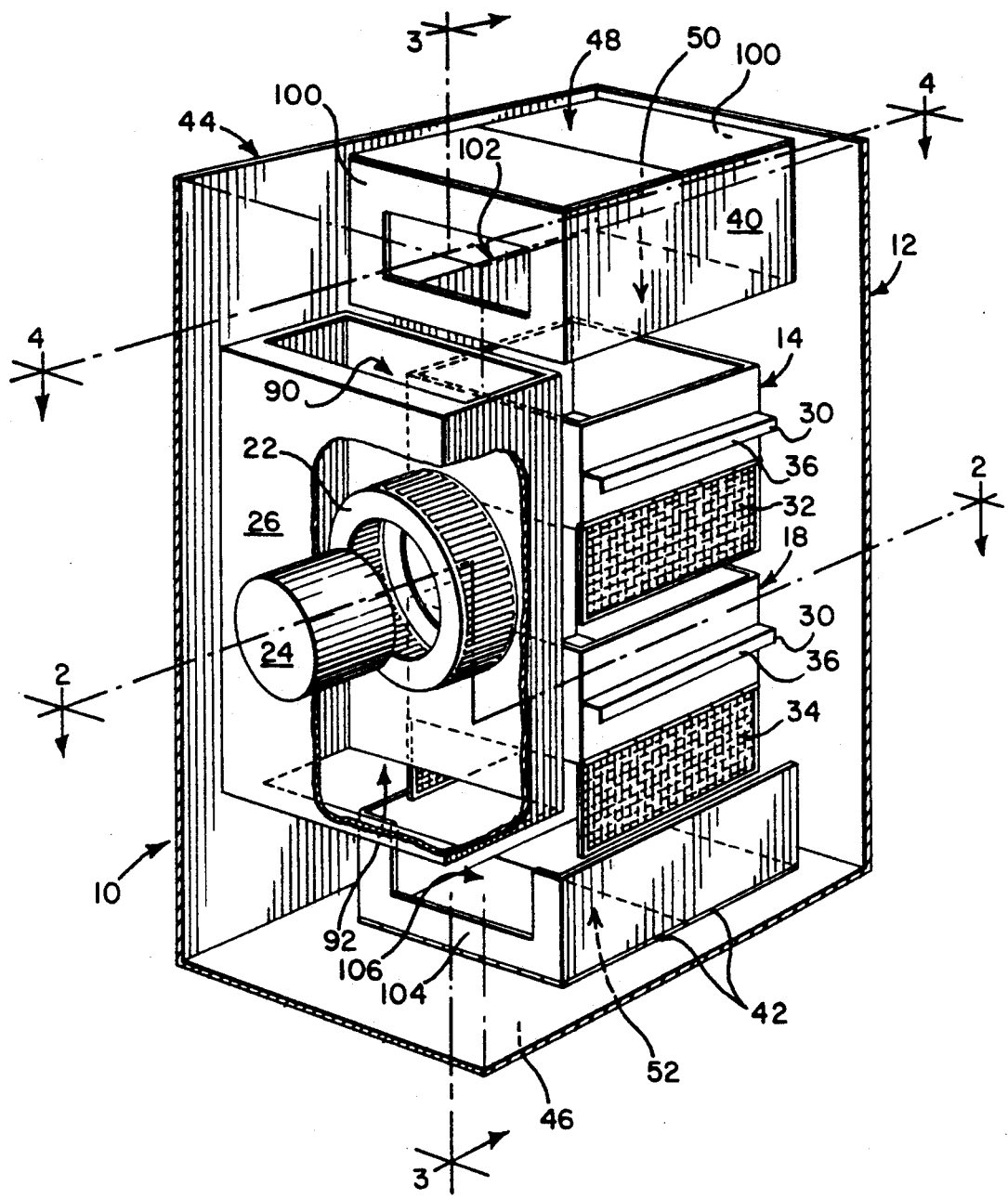
FIG. 1 is a partially cut away, isometric view of the preferred embodiment of a slacking oven designed in accordance with this invention.

FIG. 1 illustrates the overall construction of the preferred embodiment of the rapid frozen food thawing or slacking apparatus of the present invention. The preferred thawing or slacking apparatus of the present invention is a convection oven 10 that generally comprises: oven housing (generally shown in outline form) 12, an upper thawing basket 14; a lower thawing basket 18; a gas burner, electrical heater, or comparable heat source (shown generally at 114 in FIG. 2); and an air blower comprising a blower wheel or rotary convection fan 22, powered by a blower motor 24, both contained within a blower housing 26, the latter being centrally positioned alongside and between upper basket 14 and lower basket 18.

Two L-shaped brackets 30 (only one being shown in FIG. 1 for each basket), are provided respectively on opposite side walls of the housing 12 for supporting each of the baskets 14 and 18. Upper thawing basket 14 comprises an opened top, and a pair of hinged, ventilated trap doors 32, for example of wire mesh, which when closed form the bottom of the basket 14. Similarly, lower thawing basket 18 comprises an opened top and a pair of hinged, ventilated trap doors 34 forming its bottom. The opening and closing of each pair of trap doors 32 and 34 is controlled by any suitable mechanism (indicated generally at 38 for the trap doors 32 in FIG. 2 and for trap doors 32 and 34, and bottom door assembly 42, the latter being describe hereinafter in FIG. 3). For example, the hinge of each of the doors can be spring biased so that all of the doors are biased shut. Mechanism 38 can include a stepping motor coupled through a clutch to the hinge of each door. As such, when it is desirable to open the doors, the stepping motor of mechanism 38 can be energized (with the clutch mechanism engaged) causing the doors to open against the bias of the springed hinges. Once opened the doors will remain open until it is desired to close them. This can be accomplished by disengaging the clutch of mechanism 38 and the doors will automatically shut because of the hinged springs. Ventilated trap doors 32 and 34 may comprise wire mesh of an appropriate gauge to prevent pieces of food product from falling through without unduly restraining the passage of an air stream as described below. Alternatively, in place the wire mesh, doors 32 and 34 may comprise perforated sheet metal plates wherein the perforations are of such size and/or shape to prevent pieces of food product from falling through without unduly restraining the passage of an air stream. Baskets 14 and 18 are removably supported inside the oven housing 12 by any suitable means, such as by respective pairs of side shoulders or brackets 36 on opposite sides of each basket that mate with corresponding brackets 30 projecting from opposite inner side walls of the oven housing 12.

The apparatus further comprises top door assembly 40 and bottom door assembly 42. Top and bottom door assemblies 40 are 42 are also preferably each provided with spring biased hinges so as to be spring biased in its closed position. Top door assembly 40 is hinged to the top 44 of the oven housing 12 so that the door assembly swings downwardly from a closed position (where the top 44 of the oven housing 12 is closed to the passage of food product) to an opened position so that frozen food product can be dropped through the opening created. Similarly, bottom door assembly 42 is preferably hinged to the bottom 46 of the oven housing 12, but the latter door assembly swings upwardly from its closed position (where the bottom 46 of the oven housing 12 is closed) to its opened position so that food product will fall through to a position below the apparatus 10. The top and bottom door assemblies 40 and 42 each can be controlled with a suitable mechanism, similar to mechanism 38, so that the opening and closing of the door assemblies can be selectively controlled. Top door assembly 40 is designed to be opened when dropping food product into top basket 14, while bottom door assembly is designed to be open when dropping food product from the bottom basket 18. When closed, the doors are sufficiently sealed so as to retain a substantial amount of heat within the oven 10.

The top door assembly 40, baskets 14 and 18 and bottom door assembly 42 are all vertically aligned so as to define a vertical internal passageway 50 through which food product can pass through the oven 10 in a controlled manner by controlling the opening and closing of the door assemblies 40 and 42 and the trap doors 32 and 34. As such top door assembly 40 swings downwardly to form the entrance 48 to interior passageway 50 directly above basket 14. Similarly, bottom door assembly 42 swings upward to form the exit 52 from interior passageway 50 adjacent to and directly below basket 18. The loss of heat from the oven 10 is minimized, and thus energy efficiency is maximized, by keeping the top and bottom door assemblies closed, except when dropping product through the openings created by the open doors. In actual use, a chute 70 (seen in FIG. 3), or other suitable mechanism, can be positioned above the top door assembly 40 for feeding food product, indicated at 72, in predetermined amount to the oven 10, while a frying basket 80 (also seen in FIG. 3), or other structure for transporting food product from the slacking oven, can be positioned below bottom door assembly 42 so as to receive the thawed food product by gravity when falling through exit 52 below lower basket 18.

In accordance with the present invention a stream of hot air flow, provided by blower housing 26, is provided in opposite directions through the baskets 14 and 18. Accordingly, the top and bottom of the housing 26 are provided respectively with openings 90 and 92 as seen in FIG. 1. In addition a pair of upper partitions 100 (shown in FIGS. 1 and 4) is provided at the entrance 48 of passageway 50, adjacent the top door assembly 40 and positioned to allow the doors of the assembly 40 to open freely to a position normal to and between the upper partitions. One of the partitions 100 is positioned adjacent the top of the housing 26 and is provided with an opening 102. Similarly, a pair of bottom partitions 104 is provided at the exit 52 of passageway 50, adjacent the bottom door assembly 42 and positioned to allow the doors of assembly 42 to open freely to a position normal to and between the bottom partitions. One of the partitions 104 is positioned adjacent the bottom of the housing 26 and is provided with an opening 106 identical to opening 102. With the top and bottom door assemblies closed, a hot, gaseous stream, normally consisting essentially of air heated to a predetermined temperature, can be directed by blower wheel 22 and motor 24 through the top opening 90 of the blower housing, the side opening 102 of partition 100 into entrance 48 of the passageway 50 where it then passes downwardly through basket 14 where it contacts the frozen food product contained in basket 14 to begin the thawing operation, while at the same time the hot stream is directed through the bottom opening 92 of the blower housing, the side opening 106 of the partition 104 into the exit 52 part of the passageway 50 where it then passes upwardly through the basket 14 where it contacts food product contained in basket 18. As better seen in FIGS. 2 and 3, the air stream leaving the bottom of basket 14 and the top of basket 18 is then drawn through a return containing a heating zone 110 (to reheat the air to the predetermined temperature before passing through an aperture in the side of blower housing 26 to reach blower 22 and fan 24 for recycling.

Figure 2:
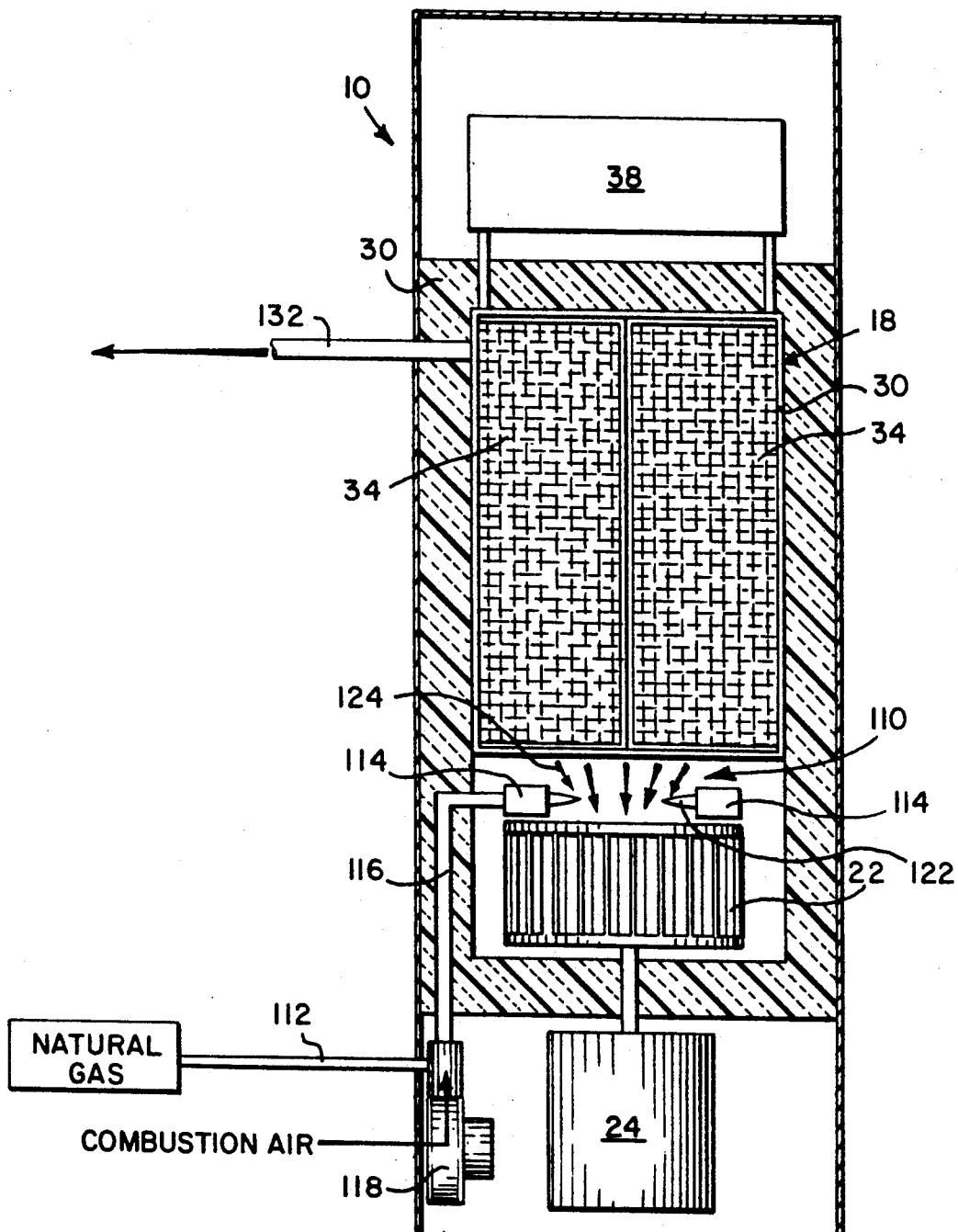
FIG. 2 is a top elevational view in cross-section, taken in the plane defined by section line 2–2 of FIG. 1.

Heat may be supplied to heating zone 110 by any conventional means, e.g. by electric resistance heating coils or by gas. In a preferred embodiment, however, the heat source is natural gas combustion which is clean, efficient and relatively inexpensive. Thus, as shown in FIG. 2, a natural gas input line 112 supplies natural gas to burners 114 through feed line 116. Combustion air is supplied to feed line 116 by a secondary air blower unit 118. The air-natural gas mixture is ignited at burners 114 to create burner flames 122 to quickly reheat the incoming air stream, indicated generally by arrows 124, to the desired temperature. The amount of heat supplied to the air stream in heating zone 110 can be easily regulated by increasing or decreasing the flow of natural gas to burners 114.

For efficiency and minimization of heat losses, it is also preferred that the interior spaces of the slacking oven between the inside walls of the housing and the thawing baskets, blower wheel, gas burners, and other components be filled with a heat-resistant insulating material 130. Venting means 132 may be provided to the interior of the slacking oven. It is also within the scope of this invention for the slacking oven to be positioned adjacent to or even connected to a freezer unit (not shown) for storing the frozen food product immediately prior to the thawing operation.

Although the slacking oven of this invention may be constructed of almost any desired size to meet a particular need, in general it is envisioned that, as shown in FIG. 1, the apparatus would stand about 30 inches high, be about 24 inches in depth and approximately 10 inches in width. Each thawing basket would, accordingly, be about 10 inches long by about 6 inches wide and about 4 inches deep. Other components of this apparatus would be correspondingly sized, as would be apparent to those skilled in the art. Thus, the relatively compact thawing unit of this invention has been found completely adequate to meet the requirements of supplying thawed food product to modern, automated frying systems, as described above.

Figure 3:
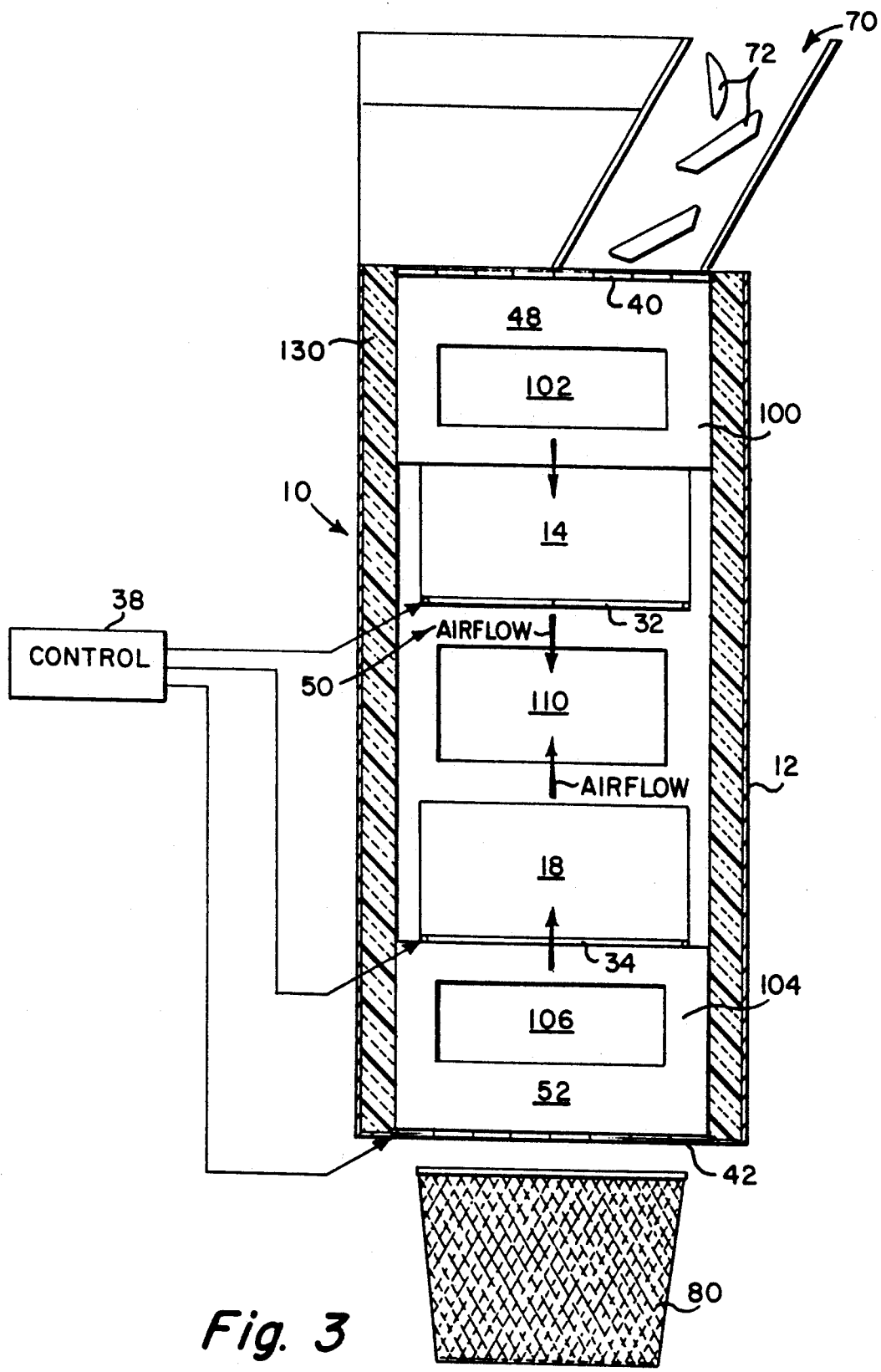
FIG. 3 is a front elevational view in cross-section, taken in the plane defined by section line 3–3 of FIG. 1.
Figure 4:
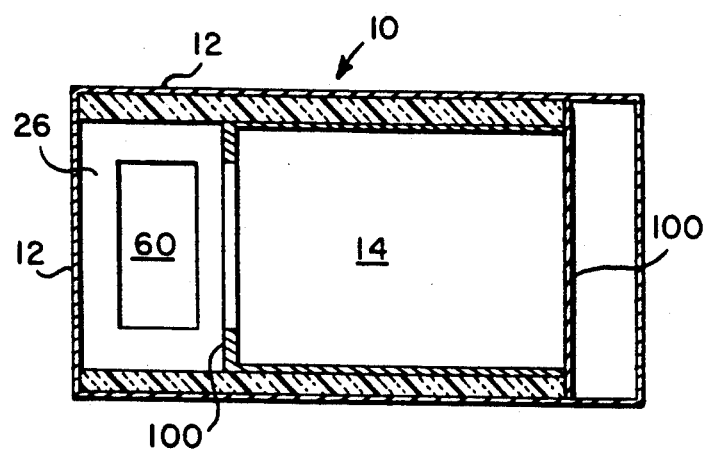
FIG. 4 is a top elevational view in cross-section, taken in the plane defined by section line 4–4 of FIG. 1.

FIG. 3 illustrates the operation of the apparatus of this invention. A batch of frozen food product 72 of predetermined size is introduced manually or automatically into chute 70 positioned above the slacking oven 10 and, by action of gravity or the appropriate mechanism similar to mechanism 38, the hinged top door assembly 40 will open downwardly into the oven. Chute 70 may be equipped with an automatic feeding device (not shown) for feeding a new batch of frozen food of a predetermined amount into the slacking oven 10 at regular, predetermined intervals or on an as needed basis. The frozen food product then drops through the entrance 48 of passageway 50 into upper thawing basket 14 where it is subjected for a first predetermined time period, for example 30 seconds, to a downwardly flowing stream of hot, high velocity stream of air.

At the conclusion of the first time period, trap doors 40 of basket 14 are opened downwardly by the corresponding mechanism 38 permitting the partly-thawed food product to drop by gravity through heating zone 110 and into lowermost thawing basket 18. The food product is held in basket 18 for a second predetermined time period, such as 30 seconds, while being subjected to an upwardly flowing stream of hot, high velocity steam of air. At the conclusion of the second predetermined time period, the bottom door assembly 18 is opened upwardly, and trap doors 34 of basket 18 are opened downwardly permitting the fully thawed food product to drop by gravity through the exit 52 of passageway 50, out of the oven, and then directly into fry basket 80 (or some other container) positioned below, or else onto a continuous conveyor or similar device for transport to a remotely-located fry basket.

For continuous or semi-continuous operation of the thawing apparatus, as soon as a first batch of food product drops out of top basket 14 into the bottom basket 18, the top basket trap doors 42 are closed, the top door assembly opened, and a second batch of frozen food product is added to basket 14 to begin the initial thawing stage. In a preferred embodiment, the first holding time period (for basket 14) and the second holding time period (for basket 1B) are identical and synchronized so that both baskets are in use simultaneously, although it will be clear that when both baskets are full of food product, the bottom door assembly 42 and doors 34 of lower basket 18 will have to release its load first to the basket 80, while the bottom doors 32 of the upper basket remain closed. Only after the doors 34 are closed will the upper basket release its load. Similarly, the upper basket must release its load to the lower basket and the trap doors 32 closed before it can receive another load through the upper door assembly 40. Thus, as soon as a fully thawed batch of food leaves basket 18, a new partially-thawed batch of food is on its way from basket 14, and a new batch of fully frozen food is on its way into basket 14.

Accordingly, one of the benefits of the two-stage process of this invention is the ability to operate in continuous or semi-continuous fashion. Another advantage of the two-step process is that by causing the food product to tumble through blower suction zone 74 between baskets 14 and 18, any remaining frozen junctions between adjacent food pieces are broken apart and new surfaces are exposed to the hot air stream. By directing the air flow through baskets 14 and 18 in opposite directions, even and complete slacking by exposing all frozen surfaces to the hot air stream is almost assured. Staging also allows more throughput of food product while providing the necessary dwelling time to obtain complete thawing.

Once the food product enters the slacking oven 10 from chute 70, it moves through the oven entirely by gravity feed. By minimizing the need for complex moving parts, the slacking oven of this invention achieves substantial cost savings in energy and maintenance.

Prototype thawing system results indicate that a 240° F. oven setpoint maintained using a 9 kw (thermal) heat source is capable of thawing approximately 3 lbs. of frozen french fries (i.e. about 1.5 lbs./batch in each basket) per one minute interval with an airflow of about 75–100 cubic feet per minute (cfm) through each basket of fries and an air temperature gradient through the frozen fries of roughly 400° F. (at basket entry point) to 190° F. (at basket exit point). Temperature settings, airflow rates, residence times, and amount of food product processed in accordance with this invention are all interdependent variables and can be adjusted by routine experimentation to suit particular conditions or requirements. For example, larger frozen food pieces may require some combination of smaller batches, longer residence times, and higher temperature and flowrates to achieve complete thawing than would be required for smaller frozen food pieces.

By appropriate adjustment of the several process variables as discussed above, the apparatus and process of this invention can be adapted for rapid thawing of a wide variety of frozen food products. In addition to french fried potatoes, this invention is useful in thawing frozen onion rings, frozen breaded vegetables (mushrooms, zucchini sticks, etc.), frozen breaded seafood (clams, clamstrips, scallops, shrimp, fish pieces, and calamari), frozen breaded chicken, frozen breaded cheese sticks, and other frozen food products.

Although not shown in the drawings, it is envisioned and is within the scope of this invention to design a thawing system in accordance with this invention that employs more than two sequential thawing baskets, e.g. a three or four-basket system. Such multi-stage systems could have utility, for example, where it is desired to thaw and fry larger batches of food but at the same throughput rate. The holding times in each basket would be adjusted and coordinated such that the product coming from the final basket would be fully thawed. It is preferred that the direction of the hot air stream be changed or reversed at each step to facilitate even slacking. Although such a multi-stage system would obviously require a more complex apparatus than that described above, the design of such a system is well within the purview of one skilled in the art based upon the teachings contained herein. For example, a four-basket system could be created simply by stacking two of the two-basket units as described above.

Since other changes may be made in the above-described apparatus and process without departing from the scope of the invention herein involved, it is intended that all matter contained in the above description or shown in the accompanying drawings shall be interpreted in an illustrative and not in a limiting sense.

Having described the invention, what is claimed is:

1. Apparatus for rapid thawing of multiple frozen food pieces, said apparatus comprising, in combination:
   (a) housing means comprising food inlet means and food outlet means;
   (b) upper and lower basket means for holding food pieces;
   (c) basket support means for holding said upper and lower basket means inside said housing means with said basket means in substantially vertical orientation, one above the other;
   (d) blower means for circulating a hot, gaseous stream inside said housing means so as to cause at least a part of said stream to pass through said upper basket means in one general direction and at least another part of said stream to pass through said lower basket means generally in an opposite direction; and
   (e) heating means for heating said gaseous stream to a predetermined temperature before circulating said stream through said upper and lower basket means.

2. Apparatus according to claim 1, wherein each basket means comprises connected side walls, a top having an opening, and a bottom including downwardly opening basket door means, said door means including openings small enough to contain the food pieces when said door means is closed, but large enough to expose the pieces to substantial contact to a gaseous stream passing through the openings of said door means.

3. Apparatus according to claim 2, wherein said door means includes a wire mesh.

4. Apparatus according to claim 2, further wherein said heating means comprises at least one natural gas burner and means for supplying a stream of natural gas and combustion air to said at least one burner.

5. Apparatus according to claim 2, further wherein said food inlet means comprise at least one downwardly opening housing door hinged to the top of said housing means.

6. Apparatus according to claim 2, further wherein said food outlet means comprise at least one upwardly opening housing door hinged to the bottom of said housing means.

7. Apparatus according to claim 2, further wherein said basket support means comprise a pair of shoulders externally mounted on opposite sides of each basket means adapted to mate with corresponding lips projecting from opposite inner sides of said housing.

8. Apparatus according to claim 2 further wherein said basket door means comprise a pair of wire screens hinged to the bottoms of opposite side walls of said basket means.

9. Apparatus according to claim 2 further wherein said basket door means comprise perforated sheet metal plates hinged to the bottoms of opposite side walls of said basket means.

10. Apparatus according to claim 2, further comprising door drive means to open and close said basket door means.

11. Apparatus according to claim 2, further wherein said blower means comprises a fan and motor centrally positioned alongside and between said upper and lower basket means.

12. Apparatus according to claim 11, further comprising a blower housing surrounding said blower means, said blower housing including a top aperture in communication with the top end opening of said upper basket means and a bottom aperture in communication with the bottom end of said lower basket means.

13. Apparatus according to claim 1, further including control means for selectively controlling (a) the dropping of food pieces from said upper basket means to said lower basket means and (b) the dropping of food pieces from said lower basket means to a position below said lower basket means.

14. Apparatus according to claim 13, wherein each basket means includes a ventilated bottom trap door, and said control means includes means for selectively opening and closing each of said bottom trap doors.

15. Apparatus according to claim 14, wherein said control means sequentially (a) opens the bottom trap door of said lower basket means so as to drop any food pieces in said lower basket means to said position below said lower basket means, (b) closes the bottom trap door of said lower basket means, (c) opens the bottom trap door of said upper basket means so as to drop any food pieces in said upper basket means to said lower basket means, and (d) closes the bottom trap door of said upper basket means.

16. Apparatus according to claim 15, wherein said apparatus further includes gravity feed means for introducing food pieces into said upper basket means following the closing of the trap door of said upper basket means.

* * * * *